(12) United States Patent
Nagata et al.

(10) Patent No.: US 7,658,899 B2
(45) Date of Patent: Feb. 9, 2010

(54) PRODUCTION METHOD OF NANOPARTICLE

(75) Inventors: Yasushi Nagata, Tokyo (JP); Kazuya Tsukada, Kanagawa (JP); Hideki Hoshino, Tokyo (JP)

(73) Assignee: Konica Minolta Medical & Graphic, Inc. (JP)

( * ) Notice: Subject to any disclaimer, the term of this patent is extended or adjusted under 35 U.S.C. 154(b) by 0 days.

(21) Appl. No.: 12/162,064

(22) PCT Filed: Dec. 26, 2006

(86) PCT No.: PCT/JP2006/325858

§ 371 (c)(1),
(2), (4) Date: Jul. 24, 2008

(87) PCT Pub. No.: WO2007/086225

PCT Pub. Date: Aug. 2, 2007

(65) Prior Publication Data

US 2009/0060825 A1  Mar. 5, 2009

(30) Foreign Application Priority Data

Jan. 27, 2006  (JP) .............................. 2006-019460

(51) Int. Cl.
*C01B 53/00* (2006.01)
*B22F 1/00* (2006.01)

(52) U.S. Cl. ........................ 423/349; 423/350; 423/348; 204/157; 204/157.15; 204/157.21; 204/157.22; 204/157.41; 204/157.4; 556/479

(58) Field of Classification Search ................. 423/348; B22F 1/00, 9/30; B32B 5/16; C01B 33/021, C01B 41/00; C22B 41/00
See application file for complete search history.

(56) References Cited

U.S. PATENT DOCUMENTS 5,850,064 A * 12/1998 Goldstein ................ 204/157.4

2004/0229447 A1 * 11/2004 Swihart et al. .............. 438/507
2007/0232479 A1 * 10/2007 Dez et al. ..................... 501/88

FOREIGN PATENT DOCUMENTS

| FR | WO2005-082808 | * | 9/2005 |
| JP | 5-224261 | | 9/1993 |
| JP | 2006-216761 | | 8/2006 |
| JP | 2006-256918 | | 9/2006 |
| US | WO2006-083269 | * | 8/2006 |

OTHER PUBLICATIONS

Heath (Science 1992, 258:1131-1133).*
International Search Report for International Application No. PCT/JP2006/325858 mailed Feb. 13, 2007.
Nikkei Sentan Gijutsu (Nikkei Advanced Technology), Jan. 27, 2003, on p. 1-4 (with English translation).
V.E. Ogluzdin, Interpretation of the Visible Photoluminescence of Inequisized Silicon Nanoparticles Suspended in Ethanol, Semiconductors, vol. 39, No. 8, p. 884-890, Aug. 2005, p. 887, lower right column, 8th line from the bottom to p. 888, right column, line 4 (4. Experimental).
Taisuke Oku et al., "Kanetsu Yoeki ni yoru Silicon Handotai Nano Ryuushi no Gosei" The Society of Chemical Engineers, Japan, Nenkai Kenkyu Happyo Koen Yoshishu, vol. 70, Feb. 22, 2005, p. 72 (with English translation.
International Search Report for International Application No. PCT/JP2006/325858 mailed Feb. 13, 2007 with English Translation.

* cited by examiner

*Primary Examiner*—Melvin C Mayes
*Assistant Examiner*—Jun Li
(74) *Attorney, Agent, or Firm*—Cantor Colburn LLP

(57) ABSTRACT

A production method of nano-sized silicon crystal particles comprising the step of allowing monosilane to be oxidized in a bulk liquid phase to form the nano-sized silicon crystal particles within the bulk liquid phase, wherein a liquid of the bulk liquid phase is an unsaturated hydrocarbon free from an oxidizing gas; and isolating the nano-sized silicon crystal particles from the bulk liquid phase.

2 Claims, No Drawings

PRODUCTION METHOD OF NANOPARTICLE

CROSS REFERENCE TO RELATED APPLICATIONS

This is a U.S. national stage of application No. PCT/JP2006/325858, filed on Jan. 27, 2006. Priority under 35 U.S.C. §119 a) and 35 U.S.C. §365(b) is claimed from Japanese Application No. 2006-019460, filed 27 Jan. 2006, the disclosure of which is also incorporated herein by reference.

TECHNICAL FIELD

The present invention relates to a production method of nanoparticles, and specifically to a production method of nano-sized silicon fine particles.

BACKGROUND

It is known that so-called nanoparticles, featuring a particle diameter of about the wavelength of an electron (about 10 nm), formed of a crystal such as a semiconductor or metal exhibit specific physical properties different from those of bulk bodies due to a large influence of size finiteness on the movement of electrons (please refer, for example, to Non-patent Document 1).

It is conceivable that, for example, the band gap of the above nanoparticles is widened due to an effect of size finiteness. However, such nanoparticeles exhibit excellent light absorption characteristics and emission characteristics. Accordingly, the development for nanoparticle phosphors is anticipated.

As production methods of nanoparticle phosphors incorporating a silicon crystal as a core among these nanoparticle phosphors, there is known a production method of silicon/silicon oxide nanoparticle phosphors wherein a core, composed mainly of a silicon crystal, is formed via a gas phase method and then an insulating layer, composed of silicon oxide, is provided by oxidizing an amorphous layer of a silane which is present on the surface of the core (please refer, for example, to Patent Document 1).

Non-patent Document 1: Nikkei Sentan Gijutsu (Nikkei Advanced Technology), Jan. 27, 2003, on pages 1-4

Patent Document 1: Unexamined Japanese Patent Application Publication No. (hereinafter referred to as JP-A) 5-224261

DISCLOSURE OF THE INVENTION

Problems to be Solved by the Invention

However, in the silicon/silicon oxide nanoparticle phosphors described in Patent Document 1, as raw materials, there are employed nanoparticles, composed mainly of silicon, incorporating an amorphous layer of a polysilane which is just present on the surface of a silicon monocrystal core as such, and the surface is subjected to oxidization treatment to obtain the particles. Accordingly, there has still been room for improvement of the emission intensity and fluorescence life of the phosphors. Further, the production method of a nanophosphor described in Patent Document 1 employs a gas phase method, and silane gas as a raw material is not always efficiently used, whereby there has been noted a problem in productivity.

Means to Solve the Problems

The present inventors conducted diligent investigations on the above problems and the present invention was completed.

An object of the present invention is to provide a production method of nanoparticles, and specifically to provide a production method of nano-sized silicon fine particles, in which production method of producing silicon crystal nanoparticles in a liquid phase, the silicon crystal nanoparticles may be produced with high productivity and also a nanophosphor, exhibiting an improved emission intensity and fluorescence life, was realized.

Namely, the production method of silicon crystal nanoparticles of the present invention is characterized by producing a nano-sized silicon crystal nanoparticles via oxidation reaction of a monosilane in a liquid phase.

Further, a liquid used for the liquid phase is preferably an unsaturated hyrdocarbon, specifically an unsaturated hydrocarbon containing no oxidizing gas.

Effects of the Invention

According to the present invention, a nanophosphor, exhibiting an improved emission intensity and fluorescence life, can be realized, and also silicon crystal nanoparticles, which serve for the production thereof, can be produced with high productivity.

BEST MODE TO CARRY OUT THE INVENTION

The present invention will now be detailed.

[Reaction Raw Material]

In the present invention, a monosilane is subjected to oxidation reaction in a liquid phase. The monosilane used is not specifically limited.

Compounds used for the liquid phase of the present invention are not specifically limited provided that oxidation reaction converting a monosilane, to be described later, into silicon crystal nanoparticles is not inhibited and oxidation reaction converting the produced silicon crystal nanoparticles into silicon oxide is not induced.

There are exemplified unsaturated hydrocarbons such as propene, butene, pentene, 1-hexene, 2-hexene, dimethylbutene, heptene, or styrene, or mixtures of these compounds. In cases in which the above compounds are unsaturated hydrocarbons, released hydrogen reacts with the unsaturated hydrocarbons to form saturated hydrocarbons when silicon crystal nanoparticles are produced from a monosilane via oxidation reaction to be described later. Therefore, silicon crystal nanoparticles can further efficiently be produced from a monosilane (for example, silane gas), and also no oxidation reaction forming silicon oxide from the silicon crystal nanoparticles occurs, whereby the reaction tends to uniformly progress in a liquid phase. Of the unsaturated hydrocarbons, 1-pentene, 1-hexene, 2-hexene, dimethylbutene, and 1-heptene are preferable for easy handling, but 1-hexene is more preferable.

Further, from the viewpoint of absorbing hydrogen further efficiently, an appropriate metal such as Mg, Pb, or $Mg_2Ni$ which absorbs hydrogen or an alloy which also absorbs hydrogen may be contained in the liquid phase.

[Oxidation Reaction]

In the present invention, a monosilane is subjected to oxidation reaction in a liquid phase containing compounds as described above to form silicon crystal nanoparticles. Herein, in the present invention, the oxidation reaction includes reaction forming silicon via ring opening of Si—H bonds of a monosilane.

When the silicon crystal nanoparticles of the present invention are produced, it is important to select, as oxidation reaction conditions, conditions such that oxidation reaction converting a monosilane into silicon crystal nanoparticles occurs and also no reaction forming silicon oxide from the silicon crystal nanoparticles occurs. It is also important to select conditions such that most of, preferably at least 50% by weight of silicon, formed via the oxidation reaction converting the monosilane into the silicon crystal nanoparticles, is converted into a crystal, but 90% by weight thereof is more preferably converted into a monocrystal.

Oxidation reaction satisfying the above conditions includes, for example, one which is carried out in a liquid phase, preferably in a liquid phase composed of an unsaturated hydrocarbon.

As a light source used for the above light irradiation, a lamp such as an excimer lamp can be used.

Further, the energy required for the light irradiation is commonly at least 3.3 eV, but from the viewpoint of the reaction efficiency and of inhibition of reaction converting silicon into silicon oxide, the energy is preferably in the range of 3.3-4.0 eV, more preferably in the range of 3.3-3.5 eV.

In reaction carried out in a liquid phase, when a gas exists in the liquid phase, the reaction is preferably carried out in the presence of a gas containing no oxidizing gas such as oxygen, more preferably in the presence of a gas such as argon inert to silicon or silane.

In the present invention, for example, when silicon crystal nanoparticles are produced from a monosilane via the above light irradiation, the average particle diameter of the silicon crystal nanoparticles corresponds to a particle diameter in the range referred to as "nanosize", commonly featuring an average particle diameter of 1-100 nm, preferably from 1-50 nm, and more preferably from 1-10 nm.

The silicon crystal nanoparticles of the present invention can be obtained as particles via isolation form a liquid phase. For the isolation, there are employed methods such as an isolation method via evaporation of a liquid phase, a centrifugal separation method, or a poor solvent precipitation method. Further, the silicon crystal nanoparticles of the present invention can be classified for fractionation in terms of size. The classifying method includes an HPLC separation method and a solvent precipitation method.

The particle diameter of the thus-produced silicon crystal nanoparticles can be determined via transmission microscope (TEM) observation.

Silicon crystal nanoparticles featuring such an average particle diameter as described above can be produced, for example, via the following method: the air in a container of 20 l is substituted with an inert gas to create a state where no oxidizing gas such as oxygen is contained, and then the inert gas is substituted with 1-hexene to completely fill the container therewith. Subsequently, while the interior of the container is irradiated with a light energy of 3.4 eV (using an excimer lamp), 1-hexene is allowed to react with $SiH_4$ gas at 25° C. under controlling of an irradiation time of 3 minutes wherein the inner diameter of a nozzle in which the gas flows and the flow rate of the gas introduced are controlled [for example, 100 sccm (in the present invention, the gas flow rate is preferably from 50-500 sccm)]. The thus-obtained silicon crystal nanoparticles can be collected, for example, via evaporation of 1-hexene and hexane by heating the resulting liquid in the container to 80° C. after the reaction.

In the above production method of silicon crystal nanoparticles, the using efficiency of the introduced monosilane is at least 80% when determined from the amount of the introduced $SiH_4$ and the weight of the collected silicon nanoparticles, which shows that the reaction efficiency is greatly increased, compared to the using efficiency (less than 10%) of a monosilane when a similar reaction is conducted without a liquid phase.

[Surface Modification of Silicon Nanoparticles]

In silicon crystal nanoparticles obtained in this manner, most of a monosilane is converted into a silicon crystal. However, it is presumed that the silicon crystal in the outer layer is not always identical with one in the center portion, being, for example, amorphous silicon.

Accordingly, for example, in cases in which silicon crystal nanoparticles obtained in the present invention are used for a nanophosphor, the silicon crystal nanoparticles are preferably used after the surface thereof is modified. The surface modification includes a plasma treatment in the presence of hydrogen gas and formation of a silicon oxide layer.

<Plasma Treatment>

When the above silicon crystal nanoparticles are plasma-treated in the presence of hydrogen gas, the outer layer of the silicon crystal nanoparticles is converted into a silicon crystal featuring the (100) plane.

Accordingly, even when a silicon oxide layer is further formed on the surface of the plasma-treated silicon crystal nanoparticles, a silicon oxide crystal featuring the (100) plane is formed at the interface between the silicon crystal and the silicon oxide layer. The stability of the silicon crystal tends not to be decreased and also defects presumed to derive from the structure of the silicon crystal hardly tend to be caused even at the interface.

From the reason above, it is conceivable that a nanophosphor (incorporating silicon fine particles), provided with a silicon oxide layer on the surface of the above silicon crystal nanoparticles after the plasma treatment, tends to further sufficiently exhibit excellent light absorption characteristics and emission characteristics inherently possessed by the silicon crystal.

In the above plasma treatment, an output condition of plasma applied is commonly in the range of 0.1-5 kW, preferably in the range of 0.5-3 kW.

In cases in which the plasma treatment is conducted via a plasma treatment, for example, using an ICP plasma apparatus featuring a chamber volume of 40 l, the flow rate of hydrogen gas introduced is commonly in the range of 1-1,000 sccm, preferably in the range of 20-200 sccm, and the chamber pressure is commonly in the range of $1 \times 10^{-3}$-10 Torr ($1.33 \times 10^{-1}$-$1.33 \times 10^3$ Pa), preferably in the range of 0.01-1 Torr ($1.33$-$1.33 \times 10^2$ Pa). Herein, the values in the parentheses are ones obtained via calculation when 1 Torr=133 Pa, which is similarly expressed below.

When conditions for the plasma treatment fall within the above range, a stable $H_2$ glow discharge atmosphere can be created.

Of these conditions of the plasma treatment, for example, when an ICP plasma apparatus of a frequency of 13.56 MHz is used, it is preferable that the plasma output, the hydrogen gas flow rate, and the chamber pressure be 2 kW, 100 sccm, and 0.5 Torr (66.5 Pa), respectively.

The reason is that via treatment under the above conditions, the entire silicon fine particles tend to be formed of a monocrystal featuring the (100) plane and a nanophosphor exhibiting further excellent optical characteristics can be produced.

The average thickness of the outer layer of a core portion (incorporating silicon crystal nanoparticles), composed of a silicon crystal featuring the (100) plane, obtained in this manner is commonly in the range of 1-100 nm, preferably in the range of 1-50 nm, more preferably in the range of 1-10 nm, depending on the thickness of the outer layer formed of an amorphous silicon compound produced during silicon fine particle production, for example, in cases of production via the above gas phase method.

Since the outer layer of the core portion is covered with a silicon crystal featuring the (100) plane of the above thickness, the silicon crystal incorporated in a nanophosphor exhibits excellent stability even at the interface in contact with a silicon oxide layer serving as a shell portion, and also excellent emission characteristics such as an emission intensity or a fluorescence life are exhibited.

It can be verified, via transmission microscope (TEM) observation, that at least the entire surface, that is, the outer layer of the core portion is formed of a silicon crystal featuring the (100) plane via the above plasma treatment.

Further, the thickness of the outer layer and the thickness of a shell portion produced can be determined via TEM observation in the same manner as in the case when determining the average particle diameter of the core portion.

<Silicon Oxide Layer Formation>

A silicon oxide layer is formed on the surface of silicon crystal nanoparticles obtained in the present invention for use in a nanophosphor.

Methods of forming the silicon oxide layer are not limited, for example, including a method of forming a silicon oxide layer via oxidation treatment of the surface of silicon crystal nanoparticles obtained in the present invention and a method of further forming a silicon oxide layer, via a gas phase method, on the surface of silicon crystal nanoparticles obtained in the present invention.

Methods of forming the silicon oxide layer include, for example, a production method via reaction of $SiH_4$ with $O_2$ employing thermal decomposition or plasma or a production method to allow $SiH_4$ and $NO_2$ to decompose and react empolying plasma. For example, when a silicon oxide layer is formed via reaction of $SiH_4$ with $O_2$ employing plasma, $SiH_4$ and $O_2$ are introduced at flow rates of 100 sccm and 50 sccm, respectively, into a vacuum container together with silicon fine particles, followed by treatment at a plasma output of 300 W at a chamber pressure of 0.5 Torr (66.5 Pa) to obtain a stable silicon oxide layer.

The average thickness of a shell portion formed mainly of silicon oxide produced via the above method is commonly in the range of 1-100 nm, preferably in the range of 1-50 nm, more preferably in the range of 1-10 nm.

The thickness of the thus-produced shell portion can be determined via TEM observation in the same manner as in the case when determining the average particle diameter of the core portion.

The silicon crystal nanoparticles of the present invention surface-modified in this manner can preferably be used for a nanophosphor. Specifically, the emission intensity and the fluorescence life of a nanophosphor, incorporating a silicon oxide layer formed on the surface of silicon crystal nanoparticles via a gas phase method after the plasma treatment employing hydrogen gas, are approximately 10 times as high as and approximately 1.5 times as long as those of a nanophosphor composed of silicon nanoparticles obtained via a conventional steam oxidation method, respectively.

EXAMPLE

The preferred embodiments of the present invention will now specifically be described with reference to the following examples that by no means limit the scope of the present invention.

Example 1

The air in a container of a capacity of 20 l made from an optically-transparent material is substituted with high-purity Ar gas (purity: 6N; $O_2$ concentration: at most 0.1 ppm) and the container is completely filled with 1-hexene. In this case, the pressure in the container is 1 atm (1 atm=101325 Pa). Further, while a laser amount is controlled to introduce a light energy of 3.4 eV into the container using an ArF excimer laser (G40A with a wavelength of 193 nm, produced by Gigaphoton Inc.), laser irradiation to the interior of the container is initiated. Subsequently, $SiH_4$ gas is introduced into the container from a nozzle head at a flow rate of 100 sccm for 5 minutes. The laser irradiation is terminated 3 minutes after termination of the $SiH_4$ gas introduction. In this manner, silicon crystal nanoparticles were produced in a liquid phase. Thereafter, the resulting liquid containing the thus-obtained silicon crystal nanoparticles in the container was transferred to another container of a capacity of 30 l, which was heated to 80° C. under a condition of 1 atm (1 atm=101325 Pa) and 1-hexne and hexane were evaporated to collect the obtained silicon crystal nanoparticles. The using efficiency of the monosilan was at least 80% when determined from the amount of the introduced $SiH_4$ and the weight of the collected silicon crystal nanoparticles.

The average particle diameter of the thus-produced silicon crystal nanoparticles was determined via transmission electron microscope (TEM) observation (JEM4000SFX, produced by JEOL Ltd; determination magnification: 1 million times). The average particle diameter of the silicon crystal nanoparticles obtained was in the range of 1-10 nm.

The silicon crystal nanoparticles obtained in this manner were introduced into an ICP apparatus featuring a chamber volume of 40 l and a frequency of 13.56 MHz, and then a plasma treatment was carried out under conditions of a plasma output of 2 kW, a hydrogen gas introducing flow rate of 100 sccm, and an apparatus inner pressure of 0.5 Torr (66.5 Pa) to obtain silicon crystal nanoparticles formed of a silicon crystal featuring the (100) plane. The crystal plane formed in this case was verified by observing the fine particles using a transmission microscope (TEM).

The plasma-treated silicon crystal nanoparticles were introduced into a vacuum container of a chamber pressure of 0.5 Torr (66.5 Pa) together with $O_2$ gas at 200 sccm, followed by treatment at a plasma output of 300 W to form a silicon oxide layer on the surface of the silicon crystal nanoparticles. Herein, formation of silicon oxide was verified via transmission microscope (TEM) observation. Further, it was verified that the thickness of the silicon oxide layer was in the range of 1-10 nm via the TEM observation.

The emission spectrum intensity and fluorescence life of a nanophosphor obtained can be determined as follows: a nanophosphor is filled in a cell of a size of 2 cm×2 cm×5 cm absorbing almost no light, followed by irradiation of black light (black light illumination device BS3, produced by Raytronics Corp.; wavelength: 365 nm). Determination of the emission spectrum intensity and monitoring therefor were carried out using a luminance meter (CS-200, produced by Konica Minolta Sensing, Inc.).

With regard to the emission spectrum intensity, the emission intensity of the nanophosphor obtained in the present invention was approximately 15 times as high as that of a nanophosphor, incorporating silicon crystal nanoparticles as a core portion and silicon oxide as a shell portion, commonly obtained via a steam oxidation method.

A period of time required until the intensity of the emission spectrum generated at this time becomes a half of that at the initiation of determination, that is, a half life was determined. The half life was approximately 1.5 times as long as that of a common nanophosphor in which silicon crystal nanoparticles serve as a core portion on which silicon oxide is simply formed.

Therefore, it is understood that the nanophosphor obtained in the present invention exhibits a prolonged half life, that is, an improved fluorescence life.

Comparative Example 1

A 3% $SiH_4$ mixed gas diluted with $H_2$ gas was introduced into a vacuum container depressurized down to $2 \times 10^{-7}$ Torr ($2.66 \times 10^{-5}$ Pa) at 100 sccm, followed by application of microwaves of 2.45 GHz to prepare silicon crystal nanoparticles. The using efficiency of the introduced monosilane was less than 10% when determined from the amount of the introduced $SiH_4$ and the weight of the collected silicon nanoparticles. These fine particles were oxidized with an ammonia aqueous solution diluted to 5% to obtain ultrafine particles featuring an average silicon crystal diameter of 2 nm and an amorphous layer of 1.5 nm.

The ultrafine particles obtained in this time were collected and filled in a cell of a size of 2 cm×2 cm×5 cm absorbing almost no light. These ultrafine particles were irradiated with black light (black light illumination device BS3, produced by Raytronics Corp.; wavelength: 365 nm), and then the intensity of an emission spectrum generated herein was determined using a luminance meter (CS-200, produced by Konica Minolta Sensing, Inc.). The emission spectrum intensity was approximately 10 times as high as that of a nanophosphor, incorporating silicon crystal nanoparticles as a core portion and silicon oxide as a shell portion, commonly obtained via a steam oxidation method. However, the emission intensity was approximately ⅔ as high as that of the emission spectrum of the nanophosphor obtained in Example 1.

In this case, the production method of the nanophosphor is a gas phase one, and therefore the silane gas as a raw material cannot be always efficiently used, resulting in a problem in productivity.

Further, TEM observation verifies that the outer layer of the silicon crystal nanoparticles incorporated in the nanophosphor obtained in Comparative Example 1 is amorphous and has no (100) crystal plane. Therefore, it is presumed that defects presumed to derive from the structure of the silicon crystal are present in the vicinity of the interface and thereby it is conceivable that the poor emission intensity results compared to the emission intensity of the nanophosphor of Example 1.

What is claimed is:

1. A production method of nano-sized silicon crystal particles comprising the step of:
    allowing monosilane to be oxidized in a bulk liquid phase via light irradiation to form the nano-sized silicon crystal particles within the bulk liquid phase, wherein a liquid of the bulk liquid phase is an unsaturated hydrocarbon free from an oxidizing gas, and the unsaturated hydrocarbon is at least one compound selected from the group consisting of 1-pentene, 1-hexene, 2-hexene, dimethylbutene, and 1-heptene; and
    isolating the nano-sized silicon crystal particles from the bulk liquid phase.
2. The production method of claim 1, wherein the unsaturated hydrocarbon is 1-hexene.

* * * * *